(12) United States Patent
Salewski (10) Patent No.: US 7,850,244 B2
(45) Date of Patent: Dec. 14, 2010

(54) CENTER ARMREST WITH PARALLEL ADJUSTMENT CAPABILITY

(75) Inventor: Jürgen Salewski, Düsseldorf (DE)

(73) Assignee: BOS GmbH & Co. KG, Ostfildern (DE)

(*) Notice: Subject to any disclaimer, the term of this patent is extended or adjusted under 35 U.S.C. 154(b) by 260 days.

(21) Appl. No.: 11/998,077

(22) Filed: Nov. 28, 2007

(65) Prior Publication Data
US 2008/0150341 A1    Jun. 26, 2008

(30) Foreign Application Priority Data
Nov. 29, 2006    (DE) .................. 10 2006 056 651

(51) Int. Cl.
*B60N 2/46* (2006.01)
(52) U.S. Cl. .................... 297/411.32; 297/411.38
(58) Field of Classification Search .......... 297/411.2, 297/411.32, 411.33, 411.38
See application file for complete search history.

(56) References Cited

U.S. PATENT DOCUMENTS

| | | | |
|---|---|---|---|
| 1,896,477 A | 2/1933 | Boller | |
| 2,139,028 A * | 12/1938 | Mensendicck et al. | 297/284.1 |
| 4,165,901 A * | 8/1979 | Swenson et al. | 297/411.33 |
| 4,657,305 A * | 4/1987 | Meiller | 297/411.36 |
| 4,659,135 A * | 4/1987 | Johnson | 296/153 |
| 5,409,297 A * | 4/1995 | De Filippo | 297/411.32 |
| 5,571,274 A | 11/1996 | Holstensson | |
| 6,286,793 B1 * | 9/2001 | Hirose et al. | 248/118 |
| 7,104,609 B2 | 9/2006 | Kim | |
| 2006/0006722 A1 | 1/2006 | Kim | |
| 2007/0205638 A1 | 9/2007 | Schlecht et al. | |

FOREIGN PATENT DOCUMENTS

| | | |
|---|---|---|
| DE | 4135279 A1 | 4/1993 |
| DE | 29804973 U1 | 8/1999 |
| DE | 10110330 A1 | 10/2002 |
| DE | 20113440 U1 | 1/2003 |
| DE | 102004025052 A1 | 12/2005 |
| DE | 102004062942 A1 | 2/2006 |
| EP | 0670241 A1 | 9/1995 |
| EP | 1829740 A2 | 9/2007 |
| WO | WO 9423616 A1 | 10/1994 |
| WO | WO 9943237 A1 | 9/1999 |

* cited by examiner

Primary Examiner—Joseph F Edell
(74) Attorney, Agent, or Firm—Leydig, Voit & Mayer, Ltd.

(57) ABSTRACT

An armrest for motor vehicles, especially a center armrest, is provided that includes an upper part and a lower part. These two parts of the armrest are connected to each other by two articulation arrangements. Each of the articulation arrangements has two degrees of freedom, namely a rotational axis and a translational axis. In addition, locking devices are associated with each articulation arrangement, in order to lock the articulation arrangement in arbitrary translational positions.

21 Claims, 4 Drawing Sheets

CENTER ARMREST WITH PARALLEL ADJUSTMENT CAPABILITY

FIELD OF THE INVENTION

The present invention relates to armrests for motor vehicle seats.

BACKGROUND OF THE INVENTION

Motor vehicles are typically provided with a center armrest in the rear bench seat. The center armrest can be folded down from a position in which it is aligned with the backrest into a functional position. In this way, the center armrest is available for use by the rear passengers while the center seat can also be used, if necessary.

In order to allow a passenger to sit in the center position in rear seat, the center armrest can not extend forward past the surface of the backrest in the folded-up state. The thickness of the armrest is thus limited to the space available between the front, visible surface of the backrest and the rear support structure of the car body. This amount of space produces an armrest which in the folded-down state is too thin, i.e., the arm support surface is too low, so that a comfortable, ergonomic body position cannot be achieved.

A center armrest that is adjustable in thickness is taught by DE 10 2006 010 6376.9. The center armrest is composed of a lower part and an upper part, which are connected to each other on the front side of the center armrest. Using a connecting rod mechanism that is inserted between the two parts, the upper part of the center armrest can be pivoted upward or downward. However, the thickness of the center armrest is constant in the region of its front end, relative to the position of use, and corresponds to the structural thickness of the backrest.

As a result, the armrest support falls forward in the position of use of the center armrest when the upper part is brought into the maximum, greatly pivoted position.

BRIEF SUMMARY OF THE INVENTION

In view of the foregoing, a general object of the invention is to provide a center armrest in which the upper part can have a greater number of degrees of freedom relative to the lower part.

The armrest of the invention provides an armrest for motor vehicle seats, particularly a center armrest for rear bench seats of motor vehicles. The armrest includes an upper part and a lower part, with the upper part carrying an arm support surface. The upper part and the lower part are connected to each other via two articulation devices. One of the articulation devices has at least one rotary axis, which is oriented perpendicular to the longitudinal extension of the armrest. The other articulation device has two available degrees of freedom, namely a rotational axis and a translational axis. The rotational axis lies perpendicular to the longitudinal extension of the armrest, while the translational axis is oriented somewhat vertically relative to the use position of the armrest.

A locking device is provided in order to fix at least the second articulation device, which has the translational axis, in the adjustment.

If the two articulation devices are formed identically, in the sense that both articulation devices have two degrees of freedom, then the upper part can be adjusted in parallel relative to the lower part within the scope of the possible adjustment travel, or tilted (with respect to the normal nomenclature for motor vehicles) forward or backward within the scope of the possible adjustment travel.

The armrest can be connected to the motor vehicle with its lower part via a horizontal bearing shaft. This horizontal bearing shaft lies perpendicular to the longitudinal axis of the lower part, whereby the armrest can be pivoted from an approximately horizontally oriented use position where it can be used as an armrest into an approximately vertically oriented rest position. In the rest position, the armrest can be used as an extension of the backrest, in order to provide a third sitting location.

The armrest can have an associated control device that can be activated by the pivoting movement of the armrest. With the control device, a pivoting up motion brings the armrest into a position in which the upper part and the lower part lie as close to each other as possible. The control device can be further provided with a memory function, which has the effect that when the center armrest is pivoted down, the upper part is brought back into the position relative to the lower part that these two parts had before the pivoting up motion.

Favorable installation conditions can be produced when the upper part is shaped like a shell. The individual gear parts, which form the articulation arrangements, are housed hidden in order to rule out a risk of injury while protecting the articulation devices against damage.

The upper part can cover the lower part, which prevents objects from falling from above into the gap between the two parts and thus from being able to reach into the interior of the armrest.

The two degrees of freedom of the articulation device can be implemented easily with a gear being mounted on one part, preferably the lower part, while the other part is provided with a toothed rack. The toothed rack can be kept engaged with the gear by a spring. Those skilled in the art will appreciate that a rotating gear allows both a pivoting of the toothed rack and also a longitudinal displacement in the respective pivoted position. The rotational axis of the gear can be aligned perpendicular to the longitudinal axis of the armrest.

If each articulation device has two gears that are coupled to each other via a rigid shaft, the upper part can be easily supported (without any special guides) such that it cannot tilt relative to the lower part, in the sense that the upper part cannot rock relative to an axis parallel to the longitudinal axis.

If a locking device is associated with the relevant gear, the height or pivoted position can be fixed, which is set by the relevant articulation device. The locking device can comprise a detent pawl, which engages in the gear interacting with the toothed rack. The locking pawl of the locking device can sit on a bearing carrier that is rotatably mounted coaxial to the relevant gear. A stop can be associated with the bearing carrier, and also a holding device so that the bearing carrier is fixed in a functional position, in order to also fix the relevant gear in the necessary rotational position.

The holding function is detachable in the sense that when the armrest is pivoted up, the bearing carrier is turned together with the relevant gear so that the armrest can be brought into its position with the smallest thickness.

For turning the gear, a control rod can be provided with which the pivoting position of the armrest is determined and conveyed to the articulation device. The arrangement can be configured so that the activation travel of the activation device is dependent on the distance of the upper part from the lower part. The activation device includes a toothed rack, which interacts with another gear that is supported coaxial to the gear of the articulation arrangement. These two gears can interact with each other via a slotted-link arrangement. The slotted-link arrangement can be formed from a peg and a slot lying around the rotational axis of the gears. When the armrest is pressed together by the user, the edge of the slot is removed from the peg, so that when pivoting upward, the peg runs with practically no load. On the other hand, if the armrest is brought into its maximum position, the edge or end of the slot lies in the immediate vicinity of the peg, so that the gear of the articulation arrangement is rotated to a maximum rotational angle when the armrest is pivoted up into the rest position. For controlling the toothed rack, a gear can be used that is rotationally fixed on the bearing shaft of the center armrest.

The following description of preferred embodiment explains the necessary aspects for understanding the invention. Additional details that are not described can be inferred in the usual way by someone skilled in the art from the drawings.

The drawings are not necessarily to scale. For illustrating certain details, certain regions are enlarged. In addition, the drawings are simplified and do not contain each optional detail for a practical implementation.

DETAILED DESCRIPTION OF THE INVENTION

Figure 1:
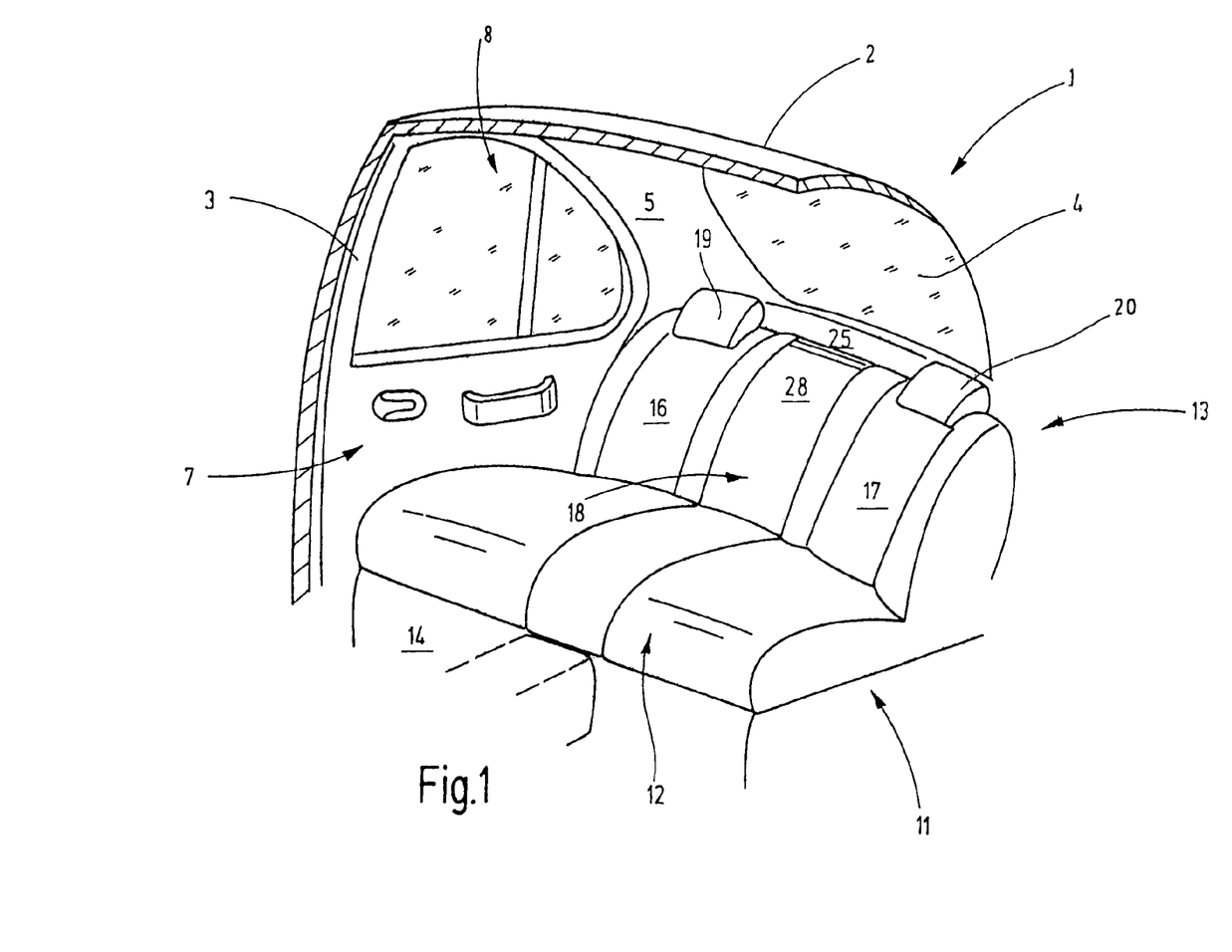
FIG. 1 is a schematic cut-away perspective view of the rear section of an illustrative passenger car including an exemplary center armrest according to the present invention.

Referring to FIG. 1 of the drawings, a rear section of a passenger car is shown. FIG. 1 provides a view towards the right interior, which is mirror-symmetric to the not-shown left interior. The figure is simplified. For example, car body internal structures, such as braces and attachment means, are not shown because their representation is not necessary for understanding the invention. Likewise, the drawing of the car body is schematized, and the hollow spaces present there cannot be seen. Unless otherwise indicated, terms, such as left, right, top, and bottom, refer to directions on the vehicle itself, as typically used.

The illustrated car body section 1 has a roof 2. A B-pillar 3 is led at the side of the roof 2 downward to a floor assembly. A corresponding B-pillar is provided on the cut-away left vehicle side. The roof 2 transitions into a rear window 4 at its rear edge. At the side, the rear window ends at a C-pillar 5, which is located at a distance from the B-pillar 3. The C-pillar 5 is mirror-symmetric to the cut-away C-pillar and carries an inner lining. Between the B-pillar 3 and the C-pillar 5, a rear side door 7 is hinged to the B-pillar 3 in a known way. The side door 7 contains a window 8, as is typical for motor vehicles.

At the height of the rear side door 7 there is a rear bench seat 11 that includes a sitting surface 12 and a backrest 13. The sitting surface 12 lies on a base surface 14, which is part of the floor assembly and in which footwells are formed. A rear seat shelf 15 is provided just below the top edge of the backrest 3. The rear seat shelf 15 extends to the bottom edge of the rear window 4.

The backrest 13 is divided into a right backrest section 16 and a left backrest 17, which are spaced apart a certain distance. A backrest section 18 is provided in this intermediate space between the right and left back rest sections. The backrest section 18 simultaneously forms a center armrest when in a different functional position, and thus is also called an armrest below. The center armrest 18 is hinged in the vicinity of its lower edge, such that the pivoting axis also lies in the vicinity of the forward facing surface when the center armrest 18 is folded up. In the folded-up position, the center armrest 18 completely fills up the space between the two backrest sections 16 and 17. In this way a third auxiliary seat is produced. Head supports 19 and 20 are provided on the top edge of the backrest sections 16 and 17.

Figure 2:
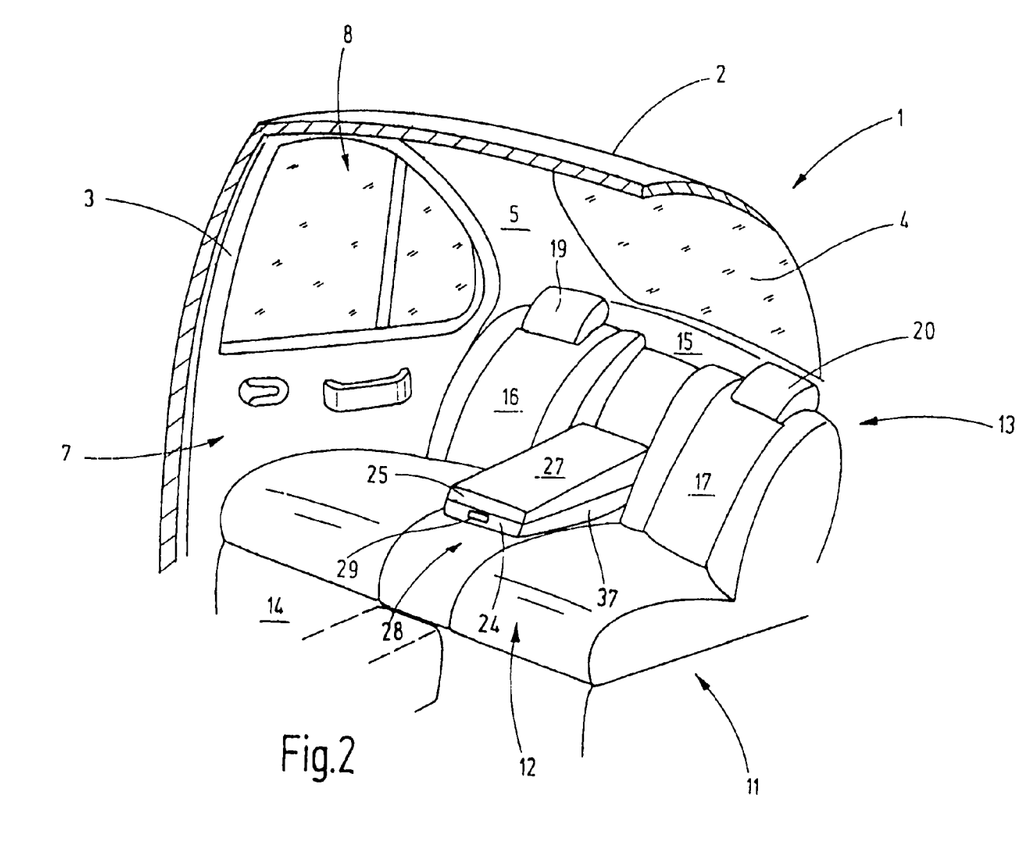
FIG. 2 is a schematic cut-away perspective view of the rear section of the passenger vehicle of FIG. 1 with the center armrest folded down into the position with minimum thickness.

While FIG. 1 shows the folded-up state of the center armrest 18, the folded-down state is shown in FIG. 2. As can be seen from FIG. 2, the center armrest 18 is composed of a center armrest lower part 22 and a center armrest upper part 23 (designated below only as upper part and lower part). The upper part 23 and lower part 22 each have ends 24 and 25, which essentially extend together and which face forward in the folded-down position shown in FIG. 2 and upward in the folded-up position of FIG. 1. The upper part 23 is supported so that it can move relative to the lower part 22. A mechanism 26 within the center armrest 18 (see FIG. 3) controls the relative movement between the upper part 23 and the lower part 22.

In the folded-down position, a surface of the upper part 23 of the center armrest 18 forms an arm support surface 27, which lies approximately horizontally in the position of use. In contrast, the lower part 22 provides a backrest surface 28 in the folded-up position.

The width of the two end surfaces 24, 25 corresponds to the depth of the two backrest sections 16 and 17 in the area of their top edges. In the folded-up position of FIG. 1, a continuous line is established at the top edge of the backrest 13. In the folded-up state, the back surface 28 also completes the profile between the two backrest sections 16 and 17.

The function of the illustrated center armrest 18 is as follows: in the folded-up position of FIG. 1, the center armrest 18 acts as a backrest for the third, center seat on the rear bench seat 11. If this spot is not used, the center armrest 18 can be folded from the position of FIG. 1 into the position of FIG. 2. In making this movement, the center armrest 18 pivots about a shaft 29 set in the vicinity of the back surface 28 and at the bottom edge of the lower part 22. The shaft 29 lies horizontally and perpendicular to the longitudinal axis of the vehicle. The downward pivoting motion is either limited by the center armrest 18 contacting the seat 12 with its back surface 28 or by corresponding internal stops that are provided.

During the downward pivoting motion, the mechanism 26 helps ensure that the upper part 23 is pivoted upward relative to the lower part 22 in order to bring the arm support surface 27 to an ergonomically comfortable height, if such a thickness was previously set as described below. The thickness of the center armrest 18 increases during this pivoting motion, while in the folded-up state the thickness of the center armrest 18 always corresponds to the thickness of the two backrest sections 16 and 17.

The thickness of the center armrest 18 can also be changed by the mechanism 26. For this purpose, an activation knob 30 can be pressed. The upper part 23 can then be pressed down in the direction of the lower part 22. This adjustability can be used either to bring the arm support surface 27 into an ergonomically favorable height or to completely open a load-through opening provided in the body wall between the passenger compartment and the trunk space.

Figure 3:
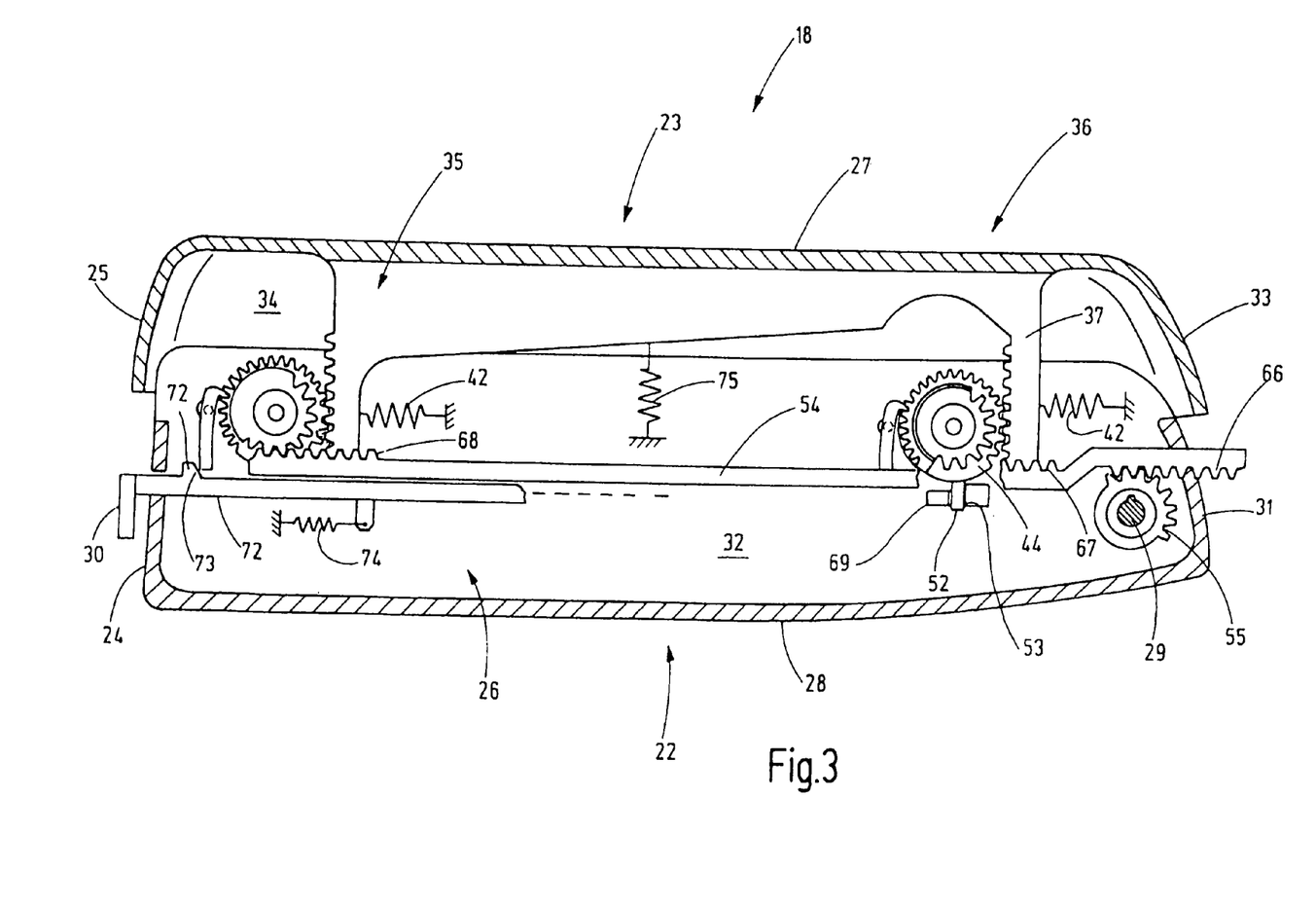
FIG. 3 is a schematic longitudinal section view of the center armrest of FIGS. 1 and 2 showing the mechanism for moving the armrest upper part relative to the armrest lower part.
Figure 4:
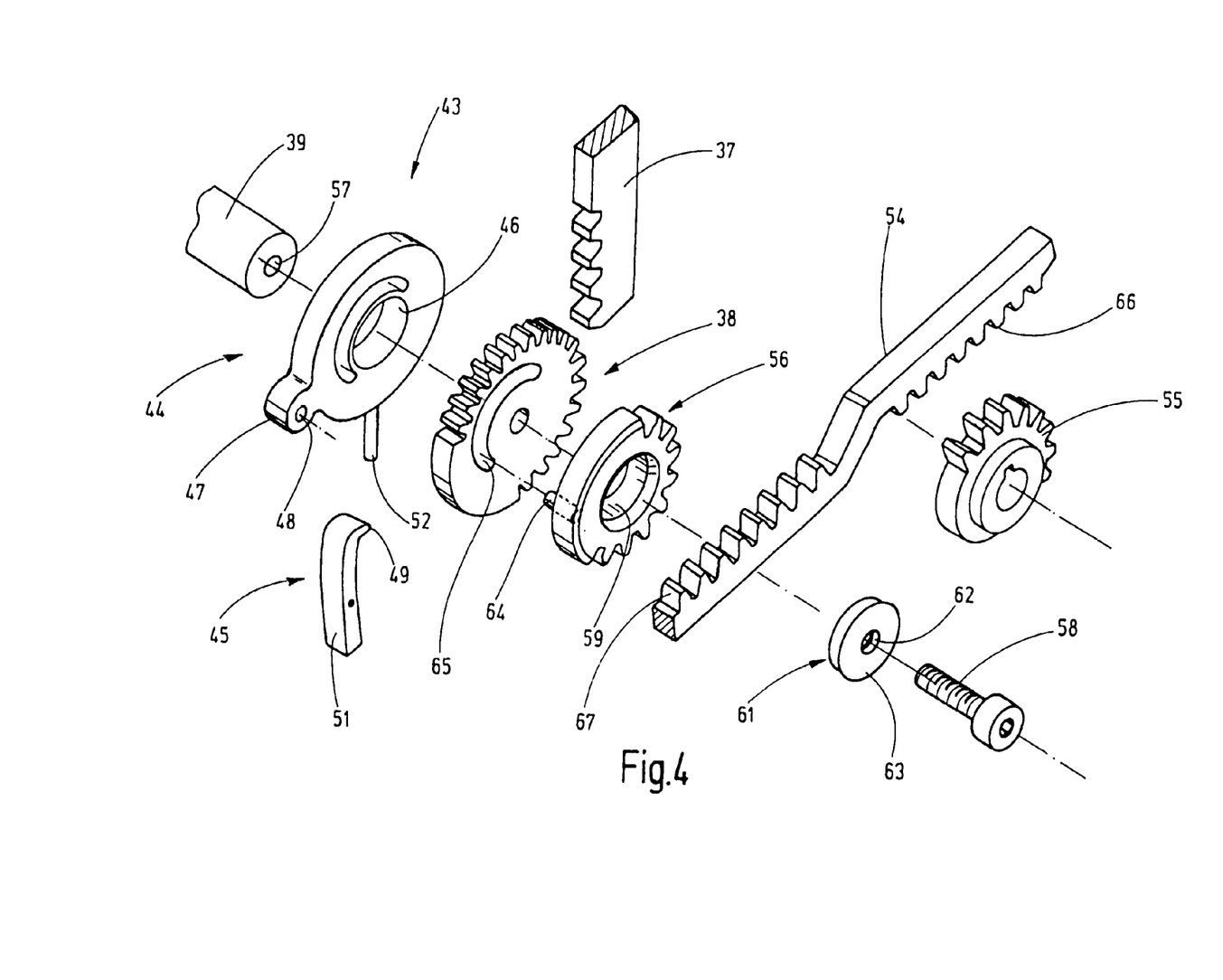
FIG. 4 is an exploded perspective view showing the elements of one of the two articulation devices.

The mechanism 26 that allows the upper part 22 to be adjusted relative to the lower part 23 is shown in FIGS. 3 and 4. Before discussing the internal construction of the center armrest in detail, it should be noted that FIGS. 3 and 4 have been simplified for reasons of clarity and understandability. For example, guides for the individual slides are missing. How the slides could be guided, if necessary, to hold them in the engaged position with the corresponding parts would be clear to someone skilled in the art. The cross-sectioning in FIG. 3 has also been simplified in order assist understanding of the invention.

Designations, such as "upper," "lower," "front," and "back" refer to normal terminology in a motor vehicle and are applied to the center armrest 18 as shown in FIG. 3 in the downward-pivoted armrest position, where the arm support surface 27 runs approximately horizontally. In contrast, "right" and "left" usually refer to the representation in FIG. 3.

The lower part 22 has an essentially shell-shaped form and is bounded by the backrest surface 28 as the base, the end 24, and a back wall 31. The back wall 31 runs approximately parallel to the end wall 24. The side walls cannot be seen in the figure, instead FIG. 3 shows an intermediate wall 32 that projects from the backrest surface 28 forming the base. A second intermediate wall 32 runs at a distance from and parallel to the first intermediate wall.

The upper part 23 also has a somewhat shell-like form. The base of the configuration forms the arm support surface 27 together with a side wall arrangement, formed by the end wall 25, a back wall 33, and two parallel side walls 34. The upper part 23 covers the lower part 22.

The two parts are connected or held in spaced apart relation by two bearing arrangements 35 and 36. Both bearing arrangements 35 and 36 are shaped so that the upper part 23 can pivot relative to the lower part about a transverse axis parallel to the pivot shaft 29, and the distance between the upper part 23 and the lower part 22 can be adjusted by a translational motion. The translational axis is approximately perpendicular to the planes defined by the arm support surface 27 or the backrest surface 28.

The two bearing arrangements 35 and 36 are identical to each other. Thus, it is sufficient to explain the construction of only one of the two bearing arrangements. Corresponding parts in the two bearing arrangements 35 and 36 are provided with the same reference symbols.

The bearing arrangement 36 comprises two toothed racks 37 leading downward from the arm support surface 27. The separation distance between the two toothed racks 37 relative to the transverse width of the center armrest 18 is somewhat greater than the separation distance of the intermediate walls 32. Furthermore, a gear 38, such as the one that can be seen in the exploded view of FIG. 4, is part of the bearing arrangement 36 next to each outer side of the two intermediate walls 32. Both the toothed rack 37 and the gear 38 carry straight teeth.

The two gears 38 of the bearing arrangement 36 mesh with the associated toothed rack 37. The two gears 38 are connected to each other by a spindle or shaft 39, which is rotatably supported in the two parallel intermediate walls 32. In this way, a forced synchronization of the two gears 38 is obtained and consequently also a corresponding forced synchronization of the toothed rack 37 engaged with it. This enforces a parallel guidance that prevents tilting of the arm support surface 27 relative to an axis parallel to the longitudinal axis of the center armrest 18. One or more springs 41, which act from the rear side against the toothed rack 37, holds the relevant toothed rack 37 in engagement with the associated gear 38.

Because the front bearing arrangement 35 is shaped in the same way, the upper part 23 has more degrees of freedom relative to the lower part. The upper part 23 can be raised relative to the lower part both in the area of the front edge and also in the area of the rear side and can be lowered at each other side. The upper part 23 performs a tilting or pivoting motion relative to the lower part about an axis lying parallel to the shaft 29. From the perspective of the gears 38, which lie close to the front end or the rear wall 31, an apparent change of separation distance of the relevant toothed rack 37 appears during tilting. This visible change in separation distance only leads to a somewhat larger tooth flank play in the engagement between the toothed rack 37 and the gear 38, without otherwise having any negative effects.

From this description of the function it also follows that the separation distance of the toothed racks 37 arranged on one side of the center armrest 18 does not quite accord with the axial separation distance of the gears 38 on the same side. The separation distance is somewhat larger.

With the help of the total of four gears 38 in connection with the total of four toothed racks 37, an arbitrary adjustment of the upper part 23 relative to the lower part 22 can be achieved. To fix the appropriate position, a locking device 43 can be provided, for example, for the gears 38, on the side of the center armrest 18 that is facing the viewer of FIG. 3, i.e., on the left side relative to the vehicle geometry.

The locking device 43 includes a detent pawl carrier 44 that is supported so that it can rotate on the shaft 39 and a detent pawl 45 supported so that it can rotate on the detent pawl carrier. The detent pawl carrier 44 has a circular disk-shaped form with a passage borehole 46 that is used as a bearing borehole and through which the shaft 39 is led. In the direction towards the front end surfaces 24 and 25, the detent pawl carrier 44 is provided with a projection 47 that contains a borehole 48 in which sits a bearing pin. The detent pawl 45 is supported so that it can rotate on this bearing pin in an axis-parallel manner to the shaft 39. The bearing pin is not shown in more detail for reasons of clarity.

The detent pawl 45 carries a locking tab 49, which is designed to be brought into selective engagement with the teeth of the gear 38. On the side away from the locking tab 49, the detent pawl 45 is provided with an activation arm 51. As can be seen from FIG. 3, the detent pawl engages the teeth of the gear 38 on one side, this being opposite the side of engagement between the gear 38 and the toothed rack 37. A spring, not shown for reasons of clarity, biases the detent pawl 45 into the engagement position with the teeth of the gear 38.

A blocking pin 52 extends downward from the peripheral side of the disk-shaped detent pawl carrier 44. The blocking pin 52 interacts with a stationary stop 53 on the intermediate wall 32, in a manner described below. A biasing spring, left out for reasons of clarity, biases the detent pawl carrier 44 on the shaft 39, so that it preferably contacts the stop 53 with the blocking pin 52.

When the center armrest 18 is set to its "thickest position," it is naturally too thick to fit in the intermediate space between the two backrest sections 16 and 17, as described above. The arm support surface 23 would bump against the body wall. An activation device is provided so that it can transition into the thinnest position independent of the adjustment position desired by the user. The activation device comprises an activation rod 54, an activation gear 55 rotationally fixed on the shaft 29, and a control gear 56 that is supported coaxial to the gear 38.

The detent pawl carrier 44, the gear 38, and the control gear 56 form a type of sandwich construction, which is screwed together with the shaft 39. For this purpose, the shaft 39 contains a threaded hole 57 for holding an attachment screw 58, which passes through the sandwich package.

In the assembled state, the gear 38 lies against the flat end face of the shaft 39. A spacer 61 with a coaxial attachment borehole 62 is led through a corresponding bearing borehole 59 in the control gear 56. The bearing borehole 59 is provided with a diagonal bevel, which interacts with a shoulder 63 on the spacer, in the direction away from the shaft 39.

In the mounted state, the detent pawl carrier 44 can rotate on the shaft 39. The gear 38 is screwed tight against the end of the shaft 39, i.e. pressed against this surface with the help of the screw 58 and the spacer 61. The spacer 61 is shaped so that the control gear 56 can rotate on it while simultaneously being secured in the axial direction. The detent pawl carrier 44 lies between the intermediate wall 32 and the gear 38.

On the side facing the gear 38, the control gear 56 carries a driver peg 64 which engages in a slot 65 that is provided in the gear 38 and curves with a constant radius about the rotational axis of the gear 38. The length of the slot and its position relative to the driver peg 64 is apparent from the following description of the function and operation.

The activation rod 54 has several spur-teeth sections 66, 67, and 68. The toothed section 66 engages with the drive gear 55. The teeth 67 mesh with the gear 38 that is adjacent to the rear wall 31, and the teeth 68 mesh with the gear 56 next to the front end 24. Thus, the two gears 56 are forcibly activated in sync by the rod 54 when the rod 54 is pushed back and forth. The back-and-forth motion is triggered by the pivoting motion of the armrest 18 about the shaft 29. During this motion, the teeth 66 roll on the gear 55. In this way, the rod 54 is pushed in the direction towards the front end 24. To achieve this motion, the teeth 66 lie in the armrest position at the top on the gear 55. In contrast, the position of engagement with the gears 56 is on the bottom side. Therefore, the gears 56 are turned in the clockwise direction when the rod 54 moves to the left, relative to FIG. 3, which corresponds to the upward folding movement.

The measures that are necessary to guide the rod 54 and to keep the gears 56 engaged are not shown for reasons of clarity. One skilled in the art knows how such guides must be shaped to obtain the functionality described below.

The rod 54 interacts not only with the gears 56, but also with the detent pawl carrier 44. To this end, the rod is provided on its bottom side with two projections 69 extending to the side (of which one is shown in FIG. 3) at the right bearing arrangement 36. Another projection of this type is located functionally in the same position in the left bearing arrangement 35.

With the help of the projection 69 together with the stop 53, the position of the detent pawl carrier 44 is fixed when the armrest 18 is pivoted downward into the functional armrest position. In this position, the rod 54 is shifted farthest to the right (relative to FIG. 2) due to the positive-fit interaction with the gear 55. The blocking pin 52 is confined between stop 53, which is fixed in position on the intermediate wall 32, and the projection 69. Thus, the detent pawl carrier 44 can rotate neither in the clockwise direction nor in the counterclockwise direction, with the result that the gear 38 engaged with the detent pawl carrier 44 via the detent pawl 45 is also fixed in the two rotational directions. The force runs through the detent pawl 45, which is constructed appropriately so that it is not forced out of engagement regardless of the rotational direction in which the gear 38 is loaded. From the detent pawl 45, the force continues via the detent pawl carrier 44 and the blocking pin 52 either to the stop 53 or to the projection 69, according to the rotational direction. The coaxial gear 38 on the other side of the shaft 39 is similarly blocked.

To be able to arbitrarily and selectively cancel the engagement between the detent pawl 45 and the gear 38, a release rod 71 is coupled with the activation knob 30. The release rod 71 carries a tooth 72 with an activation surface 73 on its top side next to each detent pawl 45. The tooth 72 is arranged next to the detent pawl 45, so that it can interact with the activation arm 51. The surface 73 is a curved surface with a radius of curvature corresponding to the radial separation distance of the surface 73 from the rotational axis of the detent pawl carrier 44. The release rod 71 is pulled to the left against a stop by means of a schematically illustrated tension spring 74, so that sufficient clearance is present between the tooth 72 and the activation arm 51.

For the sake of clarity, no guides or other stops are shown that are necessary for guiding the release rod 71 in a translational way and for limiting the activation travel. How this can be accomplished is well known to someone skilled in the art, and does not need to be explained further.

As a starting point for the explanation of the function, the armrest is in the position of FIG. 2 or FIG. 3. The armrest lies with the backrest surface 28 on the bench seat. The arm support surface points upward. It is further assumed that the armrest upper part 23 is lowered completely relative to the representation of FIG. 3. In the downward-pivoted position of FIG. 2, the rod 54 is shifted farthest to the right. The projection 69 confines the blocking peg 52 together with the stop 53. The detent pawl carrier 44 is rotationally locked. The gears 38 and 56 are in a position relative to each other such that the peg 64 has the greatest distance from the end of the curved longitudinal hole 65 lying in the peripheral direction.

From this arrangement of the center armrest 18, if the user folds the center armrest upward into the position according to FIG. 1, the rod 54 with the teeth 66 rolls on the rotationally locked gear 55. In this way, the rod 54 shifts within the center armrest 18 in the direction towards the end 24, whereby simultaneously the projections 69 are moved towards the left relative to the representation of FIG. 3 and thus release the blocking peg 52 for each of the detent pawl carriers 44. The movement of the rod 54 to the left causes a rotation of the gears 56 in the clockwise direction. Because the center armrest was already brought into the thinnest position, the gears 56 run with no load and the gears 38, which already are set and locked in the position for the thinnest armrest position, do not turn.

When the center armrest is pivoted downward, the motion of the rod 54 caused by the pivoting is stopped and the blocking pin 52 is again confined by each detent pawl carrier 44 at the completion of the downward motion in order to create a fixed counter bearing point for the detent pawl 55.

The user now wants to increase the thickness of the armrest 18. For this purpose, he activates the activation knob 30 and thus pushes the rod 71 to the right against the effect of the spring 74. This has the result that both detent pawls 51 are lifted out of engagement with the teeth of the gears 38 in the counterclockwise direction. One or more compression springs 75, which are active between the upper part 23 and the lower part 22 and of which one is indicated schematically in FIG. 3 at 74, tend to move the upper part 23 upward as the engagement is removed. If the user exerts no further force against the upper part 23, it is moved into the maximum raised position, which is limited by stops on the upper part 23 and lower part 22. The position of FIG. 3 can be, for example, this maximum thickness setting.

Through the upward movement of the upper part 23, the visible gears 38 turn in the counterclockwise direction just like the hidden gears 38 on the other side of the intermediate walls 32. In the highest position of the upper part 23, the end of the slot 65 lying in the clockwise direction is directly next to the driver peg 64.

As soon as the position is reached, the user can release the activation button 30. The spring 64 pulls the rod 71 back and the detent pawls 45 can engage in the teeth of the gears 38, in that the previously mentioned springs bias the detent pawls 45 accordingly. The springs are left out of FIG. 3 for reasons of clarity. How such springs could be mounted would be clear to someone skilled in the art, so an illustration is not necessary. After the detent pawls 45 engage, each of the gears 38 is coupled with the associated detent pawl carrier 44 via a positive fit.

Because the gears 38 are coupled in pairs via the shaft 39, a forced parallel guidance is achieved relative to the longitudinal axis of the armrest 18. Jamming cannot occur. It is sufficient that the locking by the detent pawl 45 is implemented only on one side of the shaft 39. Through the rotationally locked coupling of the gears 38 by the shaft 39, the gear 38 on the other side is automatically blocked.

If the user now sets his arm on the arm support 27 and tries to press the upper part 23 downward, the force flows via the toothed racks 37 to the gears 38. From here, the force flows further to the detent pawl 45 and it is introduced into the detent pawl carrier 44. It is not difficult to see that a force acting downward on the arm support surface 27 tends to turn the detent pawl carrier 44 in the clockwise direction in this type of application. However, such rotation cannot happen, because the blocking pin 42 strikes the stop 69 and the stop 69 is connected integrally with the rod 54, which is connected on its side with a positive fit to the rotationally-locked gear 55 via the teeth 66.

The blocking pin 52 cannot move from the position of FIG. 3, even if pressure is exerted on the center armrest 18 from above. The force coming from the blocking pin 52 would tend to move the rod 54 to the left, where it is blocked due to the positive-fit connection with the gear 55. It could then move to the left only if the armrest 18 pivots upward simultaneously, i.e. against the force that would tend to shift the rod 54 via the described kinematic path.

If through activation of the rod 71 the engagement between the detent pawls 45 and the gears 38 is lifted, the user can set the distance between the upper part 23 and the lower part 22 arbitrarily within the scope of the permissible travel. The division of the adjustment path is determined from the pitch of the gear 38.

It is possible to set a different height of the arm support 27 in the region of the front bearing arrangement 35 than in the region of the rear bearing arrangement 36. Thus, at any time it is possible to tilt the arm support surface 27 with respect to a transverse axis after activating the activation button 30 and "to freeze" the selected setting by releasing the button 30. For each bearing arrangement 35, 36, the associated locking device 43 becomes active accordingly, and fixes the desired height setting.

To understand the behavior of the armrest when is being folding upward, now it is assumed, for the sake of simplicity, that the arm support surface 27 is brought into the highest position, both at the front and at the rear end. If the user now pivots the armrest 18 upward, as already described above, the rod 54 is shifted to the left (with respect to the representation of FIG. 3) due to the rolling movement of the teeth 66 on the gear 55. In this way, the gears 56 are turned in the clockwise direction. Now, because the maximum travel is necessary to bring the armrest into the thinnest position, the driver peg 64 takes the adjacent gear 38 along and also rotates it in the clockwise direction. The toothed racks 37 are therefore pulled downward in sync against the effect of the springs 75. The thickness of the armrest 18 decreases concomitantly as it is folded upward into the rest position according to FIG. 1.

By shifting the rod 54, the stops 69 are also moved apart, so that the gears 38 positively coupled with the detent pawl carrier 44 cannot be blocked against the rotation by the detent pawl carrier 44.

In addition, during the pivoting movement of the detent pawl carrier 44 now performed, which runs in sync with the gear 38, the latching also remains. As mentioned above, the teeth 72 have a flank surface 73 that corresponds to a circular arc section. The activation arms 51 can move past these without colliding with the surfaces 53.

At the completion of the upward pivoting motion, i.e., a rotational movement of the armrest 18 relative to FIG. 3 in the clockwise direction, the rod 54 is shifted in the direction towards the end 24. The detent pawls 45 are moved in the clockwise direction upward in the direction towards the toothed rack 37 starting from the position shown in FIG. 3. The same applies for the blocking peg 62, which has moved apart from the stop 53 also by the same rotational angle.

As given from the description of the function, both locking devices 43 have turned together with the gear 56 in the engaged state with their gears 38. The travel is so large that at the completion of the pivoting motion, the armrest 18 has the same thickness as that when the armrest 18 is set to the smallest thickness in the downward pivoted position.

The effective length of the slot 65 and its position relative to the driver peg 64 can be determined from the description of the operation. For an intermediate position of the thickness of the center armrest, the rotational travel of the detent pawl carrier is reduced accordingly. It becomes zero when the folded-down armrest 18 is set to the smallest thickness.

When pivoting an armrest 18 adjusted to the largest thickness downward, the movement of the rod 54 is stopped, i.e., the gears 56 are turned by it in the counter clockwise direction. The spring or springs 75 ensure that to the degree to which the driver peg 64 retreats, the gear 38 can also rotate in the counterclockwise direction until the blocking pin 52 comes to the stop 53. Simultaneously, the projection 69 also reaches its end position and, as described above, confines the blocking pin 52 so that the arm support surface 27 can be loaded without yielding.

The described interaction between the various components of the locking device 43 naturally applies, as can be easily recognized by someone skilled in the art, for both articulation arrangements 35 and 36, without this having to be described in detail or having to make distinctions between these arrangements. The sole qualification is that both articulation arrangements can be locked at different heights.

Care must be taken that the detent pawl 45 is constructed so that it is not forced from the teeth for a torque from the gear 38 acting in the counterclockwise direction.

Because the rotational travel of the gear 38 corresponds in a practical embodiment to a quarter circle, for example, the teeth on the gear 38 for the detent pawl 45 can be shaped differently from the teeth that engage with the toothed rack 37 and that are usually involute gear teeth.

The preceding explanation relates to the shape of the armrest as a center armrest in a motor vehicle. However, it is not difficult to see that at least the height adjustment mechanism can also be used for side armrests, which are otherwise fixed. In such a case, it is sufficient to leave out the rod 54. Likewise, the gear 56 and also the detent pawl carrier 44 can be eliminated. It is sufficient when the detent pawl 45 is supported in a fixed manner next to the remaining gear 38 in order to allow the height adjustment of the upper part relative to the lower part. A separate representation of this bare-bones version of the invention for a side armrest or a front center console is not needed for understanding by someone skilled in the art.

An armrest for motor vehicles, especially a center armrest, is provided that includes an upper part and a lower part. These two parts of the armrest are connected to each other by two articulation arrangements. Each of the articulation arrangements has two degrees of freedom, namely a rotational axis and a translational axis. In addition, locking devices are associated with each articulation arrangement, in order to lock the articulation arrangement in arbitrary translational positions.

The invention claimed is:

1. An armrest for a motor vehicle seat comprising:
   a lower part;
   an upper part that carries an arm support surface;
   a first articulation device connecting the upper part to the lower part, said first articulation device having a rotational axis that extends perpendicular to a longitudinal axis of the armrest;
   a second articulation device connecting the upper part to the lower part that is spaced apart from the first articulation device, said second articulation device having a rotational axis and a translational axis, wherein the rotational axis of the second articulation device is perpendicular to the longitudinal axis of the armrest and the translational axis is approximately perpendicular to said arm support surface, said second articulation device including a first gear with a rotational axis oriented horizontally relative to the use position of the armrest and perpendicular to the longitudinal axis of the armrest, and a toothed rack engaging said first gear;
   said upper and lower arm rest parts being relatively movable in the direction of said translational axis between positions in which said upper and lower arm rest parts are in relatively separated relation to each and in which said upper and lower arm rest parts are in relatively close relation to each other,
   a locking device for locking the second articulation device in a desired adjusted position,
   a horizontal bearing shaft that extends in perpendicular relation to a longitudinal axis of the lower part for pivoting said upper and lower armrest parts upward and downward between a use position which is approximately horizontal and a rest position which is approximately vertical, and
   a control device activated by pivoting movement of the armrest for bringing the armrest into a position in which the upper part and the lower part lie in relatively close relation to each other.

2. The armrest according to claim 1, wherein the control device can be adjustably set for bringing the armrest into a previously adjusted relative position between the upper part and the lower part during the pivoting downward motion.

3. The armrest according to claim 1, wherein the upper part overlaps the lower part.

4. The armrest according to claim 1, wherein the first articulation device also has a translational axis.

5. The armrest according to claim 1, wherein the first and second articulation devices are constructed identically.

6. The armrest according to claim 1, wherein the first articulation device is a hinged joint located at a front end of the armrest.

7. The armrest according to claim 1, wherein a spring device is provided that biases the toothed rack into engagement with the first gear.

8. The armrest according to claim 1, wherein the first gear has an associated rotational locking device.

9. The armrest according to claim 8, wherein the rotational locking device has a carrier on which a detent pawl rotatably mounted, the detent pawl being is biased into engagement with the first gear.

10. The armrest according to claim 9, wherein the carrier is supported for rotation coaxially with the first gear.

11. The armrest according to claim 9, wherein the carrier has an associated fixed stop.

12. The armrest according to claim 9, wherein the carrier has an associated blocking device that holds the carrier fixed against a fixed stop.

13. The armrest according to claim 9, wherein a manually operated trigger button is provided that interacts with the detent pawl.

14. The armrest according to claim 1, further include a biasing device that biases the upper part away from the lower part.

15. The armrest according to claim 1, wherein the lower part carries a back cushion surface on an outer side.

16. An armrest for a motor vehicle seats comprising:
    a lower part;
    an upper part that carries an arm support surface;
    a first articulation device connecting the upper part to the lower part, said first articulation device having a rotational axis that extends perpendicular to a longitudinal axis of the armrest;
    a second articulation device connecting the upper part to the lower part that is spaced apart from the first articulation device, said second articulation device having a rotational axis and a translational axis, wherein the rotational axis of the second articulation device is perpendicular to the longitudinal axis of the armrest and the translational axis is approximately perpendicular to said arm support surface,
    said second articulation device having a first gear with a rotational axis oriented horizontally relative to a substantially horizontal use position of the armrest and which lies perpendicular to the longitudinal axis of the armrest, said first gear having an associated activation device that converts pivotal movement of the armrest into a rotating movement of the first gear, said activation device including a toothed rack which interacts with said first gear, and
    a locking device for locking the second articulation device in a desired adjusted position.

17. The armrest according to claim 16, wherein an activation travel path of the activation device is dependent on the setting of the distance between the upper part and the lower part.

18. The armrest according to claim 16, wherein the gear seated on the bearing shaft of the armrest is rotationally fixed.

19. An armrest for a motor vehicle seat comprising:
    a lower part;
    an upper part that carries an arm support surface;
    a first articulation device connecting the upper part to the lower part, said first articulation device having a rotational axis that extends perpendicular to a longitudinal axis of the armrest;
    a second articulation device connecting the upper part to the lower part that is spaced apart from the first articulation device, said second articulation device having a rotational axis and a translational axis, wherein the rotational axis of the second articulation device is perpendicular to the longitudinal axis of the armrest and the translational axis is approximately perpendicular to said arm support surface;

said second articulation device including a first gear with a rotational axis oriented horizontally relative to the use position of the arm rest and perpendicular to the longitudinal axis of the arm rest, said second articulation device further including a second gear spaced apart from the first gear, said first and second gears being rigidly coupled to each other by a shaft, said upper and lower arm rest parts being relatively movable in the direction of said translational axis between positions in which said arm upper and lower rest parts are in relatively separated relation to each and in which said upper and lower arm rest parts are in relatively close relation to each other, a locking device for locking the second articulation device in a desired adjusted position, a horizontal bearing shaft that extends in perpendicular relation to a longitudinal axis of the lower part for pivoting said upper and lower armrest parts upward and downward between a use position which is approximately horizontal and a rest position which is approximately vertical, and a control device activated by pivoting movement of the armrest for bringing the armrest into a position in which the upper part and the lower part lie in relatively close relation to each other.

20. An armrest for a motor vehicle seats comprising:

a lower part;

an upper part that carries an arm support surface;

a first articulation device connecting the upper part to the lower part, said first articulation device having a rotational axis that extends perpendicular to a longitudinal axis of the armrest;

a second articulation device connecting the upper part to the lower part that is spaced apart from the first articulation device, said second articulation device having a rotational axis and a translational axis, wherein the rotational axis of the second articulation device is perpendicular to the longitudinal axis of the armrest and the translational axis is approximately perpendicular to said arm support surface, said second articulation device having a first gear with a rotational axis oriented horizontally relative to a substantially horizontal use position of the armrest and which lies perpendicular to the longitudinal axis of the armrest, said first gear having an associated activation device that converts pivotal movement of the armrest into a rotating movement of the first gear, said activation device including a control gear arranged coaxial to the first gear of the second articulation device and which is coupled to the first gear via a slotted-link arrangement, and a locking device for locking the second articulation device in a desired adjusted position.

21. The armrest according to claim 20, wherein the slotted-link arrangement comprises a peg on one of the first gear and the control two gears and an opening in the other of the first gear and the control gear.

* * * * *